July 16, 1935. G. MAIURI 2,008,309
PRODUCTION AND STORAGE OF LIQUID CARBON DIOXIDE
Filed Nov. 10, 1934
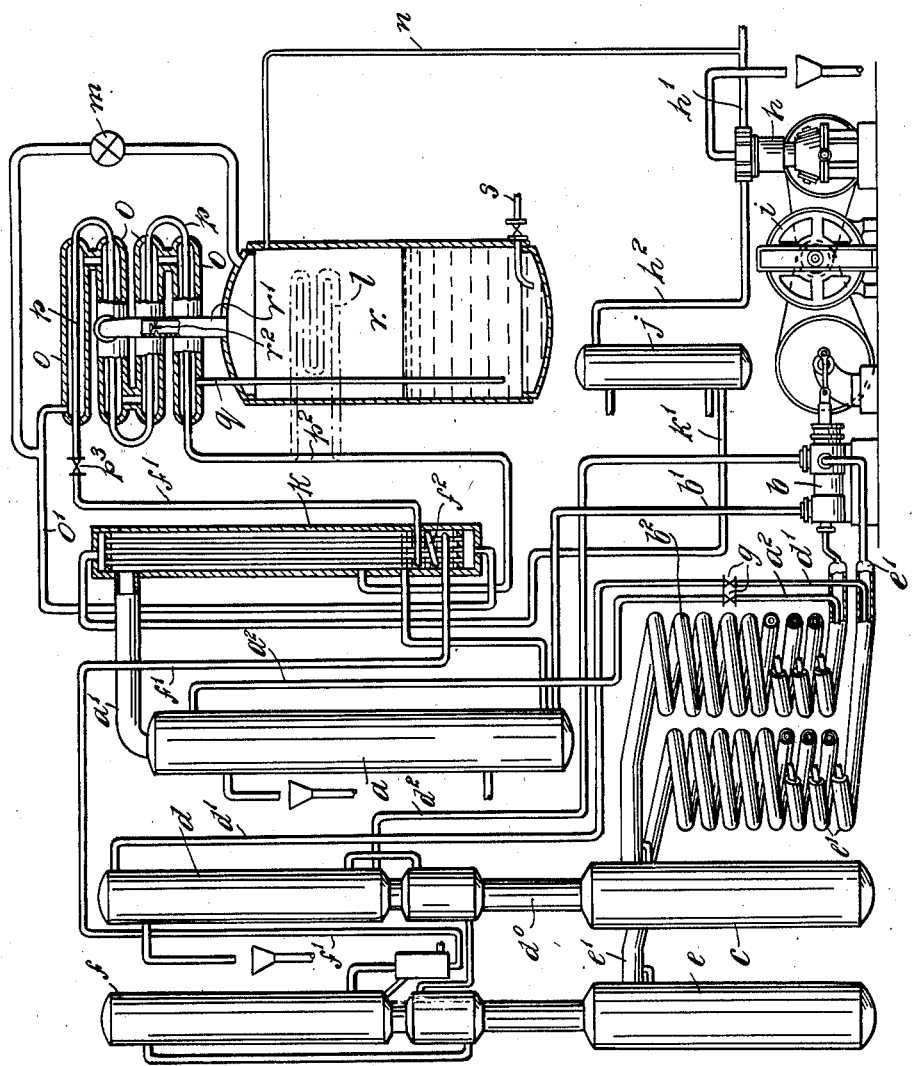
INVENTOR:
GUIDO MAIURI
BY: Francis E. Boyce
ATTORNEY Patented July 16, 1935

2,008,309

UNITED STATES PATENT OFFICE 2,008,309

PRODUCTION AND STORAGE OF LIQUID CARBON DIOXIDE

Guido Maiuri, Aldwych, London, England, assignor to Maiuri Refrigeration Patents Limited, London, England Application November 10, 1934, Serial No. 752,543
In Great Britain February 20, 1934

1 Claim. (Cl. 62—122)

This invention relates to the production and storage of liquid carbon dioxide, and its object is to produce and store liquid carbon dioxide at low pressure.

Hitherto in plants wherein liquid carbon dioxide is stored at low pressure, the liquid carbon dioxide at low pressure is produced by allowing liquid carbon dioxide at high pressure, for instance at 60 to 80 atmospheres, and at atmospheric temperature, to expand to a low pressure, for instance 15 to 7 atmospheres absolute. The gaseous carbon dioxide, which evaporates from and comprises 25% or more of the original high pressure liquid carbon dioxide, is re-compressed to the high pressure in the compressor and is re-liquefied in the condenser, of the plant.

Now according to the present invention, carbon dioxide is liquefied at low pressure by cooling and is stored and is kept at low pressure by re-liquefying by cooling gaseous carbon dioxide evaporating, by inward leakage of heat, from the stored liquid carbon dioxide.

The carbon dioxide is liquefied by cooling in a plant wherein the necessary low temperature is produced by an absorption refrigerating apparatus, and wherein the carbon dioxide is compressed to a pressure but slightly exceeding the triple point pressure.

The absorption refrigerating apparatus is preferably of the type in which ammonia is absorbed in water.

The plant for the production and storage of liquid carbon dioxide at low pressure, is illustrated diagrammatically in part sectional elevation on the accompanying drawing, in which:—

$a$ is an absorber of refrigerant vapour, such as ammonia, coming by a pipe $a^1$ from an evaporator which will be described later. Absorption liquor, such as aqua ammonia, is delivered by a pipe $a^2$ into the upper end of the absorber $a$. From the bottom of the absorber $a$ the enriched liquor flows by a pipe $b^1$ to a pumping chamber of a pump $b$, which delivers the liquor by a pipe $b^2$ into the upper end of a boiler $c$.

The above mentioned pipe $a^2$ dips into liquor in the boiler $c$.

The pipe $a^2$ extends through the pipe $b^2$ so that there is exchange of heat between weak liquor driven by the pressure in the boiler along the pipe $a^2$ to the absorber $a$, and enriched liquor arriving in the boiler $c$ by the pipe $b^2$.

Refrigerant vapour driven off from the boiler $c$ ascends a pipe $d^0$ from the boiler $c$ into a second absorber $d$.

In this second absorber $d$ the refrigerant vapour arriving from the boiler $c$ encounters weak liquor supplied by a pipe $d^1$ from a high pressure boiler $e$. The enriched liquor flows from the bottom of the second absorber $d$ by a pipe $d^2$ to a second pumping chamber of the pump $b$, which delivers it by a pipe $e^1$ to the second boiler $e$.

The pipe $d^1$ delivering weak liquor from the second boiler $e$ to the second absorber $d$ extends within the pipe $e^1$ delivering enriched liquor to the boiler $e$, so that there is heat interchange between the two liquors.

The vapour driven off from the boiler $e$ passes into a water-cooled condenser $f$, from whence the condensed refrigerant passes by a pipe $f^1$ to the evaporator which has not yet been described.

The liquid refrigerant has to boil under a very low pressure in the evaporator in order to obtain the low temperatures necessary for liquefying the carbon dioxide at low pressure. Such low pressure consequently must also exist in the absorber $a$ freely connected with the evaporator. A pressure of several atmospheres reigns in the second boiler $e$ and condenser $f$ to condense the refrigerant vapour at the temperature of the water employed for cooling the condenser. A pressure intermediate between these two pressures reigns in the boiler $c$ and second absorber $d$.

$g$ are pressure-reducing valves in the weak liquor pipes $a^2$ and $d^1$.

The evaporator is constituted by a coil $p$ wherewith the carbon dioxide is cooled by the boiling refrigerant.

Carbon dioxide gas supplied by a pipe $h^1$ is compressed by a single stage compressor $h$ to about 6 atmospheres absolute.

The compressor $h$ and the above mentioned pump $b$ are driven by a motor $i$.

From the compressor $h$ the compressed carbon dioxide gas passes by a pipe $h^2$ into a water-cooled cooler $j$ which removes the heat due to the compression, and thence passes by a pipe $k^1$ into a heat-exchanger $k$ wherein it is greatly cooled by vaporized refrigerant coming from the evaporator by a pipe $p^2$.

From the heat-exchanger $k$ the greatly cooled compressed carbon dioxide gas passes by a pipe $o^1$ to a series of jackets $o$ jacketing the coil $p$. The pipe $f^1$ which supplies liquid refrigerant from the condenser $f$, is connected past an expansion valve $p^3$ to the upper end of the coil $p$, and the lower end of the coil $p$ is connected by the pipe $p^2$ through the heat-exchanger $k$ to the pipe $a^1$ which leads the evaporated refrigerant back to the absorber $a$.

The flow of liquid refrigerant to the coil $p$ is adjusted by the valve $p^3$ so that the boiling thereof in the coil $p$ liquefies the carbon dioxide in the jackets $o$. This liquefied carbon dioxide flows down a pipe $q$ into a closed tank $r$, where it is stored and from which it can be drawn off by a cock-controlled pipe $s$, for use in a manner not concerning the present invention.

The top of the tank $r$ is vented into the jackets $o$ by a pipe $r^1$, so that gaseous carbon dioxide which evaporates, from the liquid carbon dioxide stored in the tank $r$, owing to inward leakage of heat, becomes re-liquefied on ascending to the jackets $o$.

An upwardly opening non-return valve $r^2$ is preferably provided in the pipe $r^1$ to prevent carbon dioxide passing down the pipe $r^1$ instead of traversing the full length of the liquefying jackets $o$.

Instead of the venting pipe $r^1$ leading from the top of the tank $r$ to the jackets $o$, a refrigerating evaporator coil $l$ (indicated by dot and dash lines) may be arranged in the upper portion of the tank $r$ to re-liquefy the evaporated carbon dioxide and constituting a diversion of the pipe $p^2$.

As already mentioned, the compressed carbon dioxide gas becomes greatly cooled in the heat-exchanger $k$, this cooling being due to heat exchange with the evaporated refrigerant coming from the coil $p$. The pre-cooling of the carbon dioxide thus effected can, with an appropriately dimensioned heat-exchanger $k$, be intense, as the refrigerant boils in the coil $p$ at about $-55°$ C. and can be permitted to become superheated to as near atmospheric temperature as possible, say to $+5°$ C. This increases the efficiency of the plant, and such increase of efficiency may be 10% or more.

The pipe $f^1$ which supplies the liquid refrigerant from the condenser $f$ to the pipe $o^1$ leading to the coil $p$, is coiled with a few convolutions $f^2$ in the bottom of the heat-exchanger $k$. This pre-cools, for instance from $+20°$ C. to $-5°$ C. the liquid refrigerant before it enters and boils in the coil $p$. This pre-cooling obviously reduces the amount of refrigerant which has to be evaporated in the coil $p$ to produce a useful cold temperature. The saving thus effected increases the efficiency by approximately another 10%.

All the liquid refrigerant supplied to the coil $p$ does not boil and the excess passes into and boils in the bottom of the heat-exchanger $k$. Here of course it boils under the heating effect of liquid refrigerant at much higher temperature in the small coil $f^2$. Such relatively high temperature heating under the extreme low pressure in the heat-exchanger $k$ due to the absorption proceeding in the low pressure absorber $a$, causes also the evaporation of any water contained in the excess liquid refrigerant, of which there is always a slight trace for instance .01%, as rectification is never perfect.

It is not necessary that the liquefying jackets $o$ be located at a higher level than the tank $r$. It may sometimes be more convenient to locate both at the same level. In such case a slight reduction of pressure is created in the tank $r$ to draw the liquid carbon dioxide therein from the jackets $o$. This slight reduction of pressure can be produced by a small rotary compressor $m$ which withdraws gaseous carbon dioxide from the top of the tank $r$ and delivers it back into the pipe $o^1$ or elsewhere. Alternatively, the slight reduction of pressure in the tank $r$ can be provided by a constricted vent pipe $n$ connecting the top of tank $r$ to the suction pipe $h^1$ of the compressor $h$.

The above described apparatus operates in the following manner:

Carbon dioxide gas from any source is compressed by the single stage compressor $h$ to about 6 to 9 atmospheres absolute, and, after traversing the cooler $j$, wherein it is cooled to atmospheric temperature, passes into the heat-exchanger $k$. Here the compressed carbon dioxide gas is cooled to a very low temperature by the vaporized refrigerant which flows through the heat-exchanger $k$ on its way from the evaporator coil $p$ of the refrigerating apparatus to the low pressure absorber $a$ of the refrigerating apparatus. The now greatly cooled but still gaseous carbon dioxide passes on from the heat-exchanger $k$ to the jackets $o$ surrounding the evaporator coil $p$. Here the latter further cools the carbon dioxide to a temperature just above the triple point temperature, whereby the carbon dioxide, being at 6 atmospheres and therefore at a pressure above the triple point pressure, becomes liquefied. The liquid carbon dioxide flows from the lowermost jacket $o$ down the pipe $q$ into the tank $r$ in which it is stored. The storage tank $r$ being in free communication, by the pipe $q$ and vent pipe $r^1$, with the jackets $o$ wherein the pressure is 6 to 9 atmospheres, according to the degree of compression, the stored liquid carbon dioxide is also subjected to the pressure of 6 to 9 atmospheres.

Inward leakage of heat from the external surroundings through the walls of the tank $r$ will constantly cause slow evaporation of the stored liquid carbon dioxide. Such evaporated carbon dioxide ascends the vent pipe $r^1$ into the jackets $o$ where it is re-liquefied, whereby the pressure in the tank $r$ is prevented from increasing. Alternatively, if an evaporator coil $l$ is provided within the tank $r$, the re-liquefying of the evaporated carbon dioxide occurs in the tank $r$ itself.

I claim:

In a plant for producing and storing liquid carbon dioxide at low pressure, means for compressing carbon dioxide to slightly above its triple point pressure, an absorption refrigerating apparatus including an evaporator, a chamber traversed by said carbon dioxide compressed by said compressing means to slightly above its triple point pressure and cooled by said evaporator to a temperature liquefying said so-compressed carbon dioxide, a closed tank connected to said chamber and collecting and storing carbon dioxide liquefied in said chamber, and means cooling to a liquefying temperature gaseous carbon dioxide evaporating in said tank.

GUIDO MAIURI.